(12) United States Patent
Cheung et al.

(10) Patent No.: US 7,298,299 B1
(45) Date of Patent: Nov. 20, 2007

(54) EFFICIENT DATA RECOVERY ALGORITHM FOR SERIAL DATA

(75) Inventors: Colman Cheung, San Diego, CA (US); Ray Schouten, San Diego, CA (US); Stephane Cauneau, London (GB); James Tyson, Slough (GB)

(73) Assignee: Altera Corporation, San Jose, CA (US)

( * ) Notice: Subject to any disclaimer, the term of this patent is extended or adjusted under 35 U.S.C. 154(b) by 262 days.

(21) Appl. No.: 10/970,886

(22) Filed: Oct. 21, 2004

(51) Int. Cl.
*H03M 9/00* (2006.01)

(52) U.S. Cl. ........................................ 341/100; 341/51

(58) Field of Classification Search ............... 341/51, 341/100, 101; 714/709, 814
See application file for complete search history.

(56) References Cited

U.S. PATENT DOCUMENTS 6,438,155 B1 * 8/2002 Beale ........................ 375/130
7,085,970 B2 * 8/2006 Nicholls et al. ............. 714/709
2003/0076905 A1 * 4/2003 Schetelig et al. ............ 375/343

OTHER PUBLICATIONS

Sawyer, Nick; "XILINX: Data Recovery"; 2004, www.xilinx.com; pp. 1-7, (Mar. 4, 2004).

* cited by examiner

*Primary Examiner*—Brian Young
(74) *Attorney, Agent, or Firm*—Townsend and Townsend and Crew LLP

(57) ABSTRACT

A receiving device oversamples incoming serial data using multiple phases of its system clock. The device detects an initial edge in the set of samples and selects a sample based on the location of the initial edge. A first bit is set to the value of the selected sample. A portion of the set of samples following the initial edge. If an edge is detected, then a sample is selected based upon the location of the detected edge and the next bit is set to the value of the selected sample. If an edge is not detected within this portion, then the position of the next edge is estimated. A sample is selected based upon the location of the estimated edge and the next bit is set to the value of the selected sample. The analysis is repeated for another portion of the set of samples following the newest edge.

23 Claims, 4 Drawing Sheets

EFFICIENT DATA RECOVERY ALGORITHM FOR SERIAL DATA

BACKGROUND OF THE INVENTION

Serial data communications are used to communicate data between many types of devices. Receiving and correctly decoding a stream of serial data requires the transmitting and receiving devices to be synchronized. Often, communicating a separate clock signal in addition to a stream of serial data to the receiving device is inefficient or impractical. Instead, the receiving device can perform clock data recovery techniques using a phase locked loop (PLL). The PLL analyzes the serial data stream to synchronize the receiving device.

However, PLLs often increase the cost and complexity of the receiving device. This is especially true for high-speed serial data communications, which require specialized PLLs capable of analyzing a high-speed serial data stream. To overcome these difficulties, some serial data recovery techniques do not require clock data recovery. These serial data recovery techniques do not require a specialized PLL, thereby reducing the cost and complexity of the receiving device.

Unfortunately, serial data recovery techniques that do not require clock data recovery typically have a low jitter tolerance. Jitter is small random variations in the timing of the serial data signal. For example, a typical prior serial data recovery technique has a jitter tolerance of +/−0.25 UI. Because the jitter introduced by the transmitting and receiving devices may be as much as 0.20 UI, the actual remaining jitter tolerance may be as little as 0.10 UI. This jitter tolerance is too small for many serial data communication standards, such as ASI.

Additionally, many serial data recovery techniques require the receiving device to operate at a clock speed greater than or equal to the serial data rate. The high operating speed requirements for high-speed serial data communications applications are impractical or impossible to satisfy for many types of receiving devices.

It is therefore desirable for a system and method to receive and decode serial data communications without performing clock data recovery. It is further desirable for the system and method to have a high jitter tolerance. It is also desirable for the system and method to be implemented in a receiving device having a clock speed less than the serial data rate. It is also desirable for the system and method to be optimized either for increased serial data rates or for increased jitter tolerance.

BRIEF SUMMARY OF THE INVENTION

In an embodiment of the invention, a receiving device oversamples incoming serial data using multiple phases of its system clock. The receiving device then analyzes the set of samples to decode the serial data. The receiving device detects an initial edge in the set of samples. A sample is selected based on the location of the initial edge and a first bit value is set to the value of the selected sample. A portion of the set of samples following the initial edge and corresponding to the average number of samples per bit is analyzed to detect another edge. If an edge is detected, then a sample is selected based upon the location of the detected edge and the next bit value is set to the value of the selected sample. If an edge is not detected within this portion, then the position of the next edge is estimated. A sample is selected based upon the location of the estimated edge and the next bit value is set to the value of the selected sample. The analysis is repeated for another portion of the set of sampled data following the newly detected or estimated edge. In an embodiment, the system is implemented using a programmable device, such as an FPGA.

BRIEF DESCRIPTION OF THE DRAWINGS

The invention will be described with reference to the drawings, in which.

DETAILED DESCRIPTION OF THE INVENTION

Figure 1:
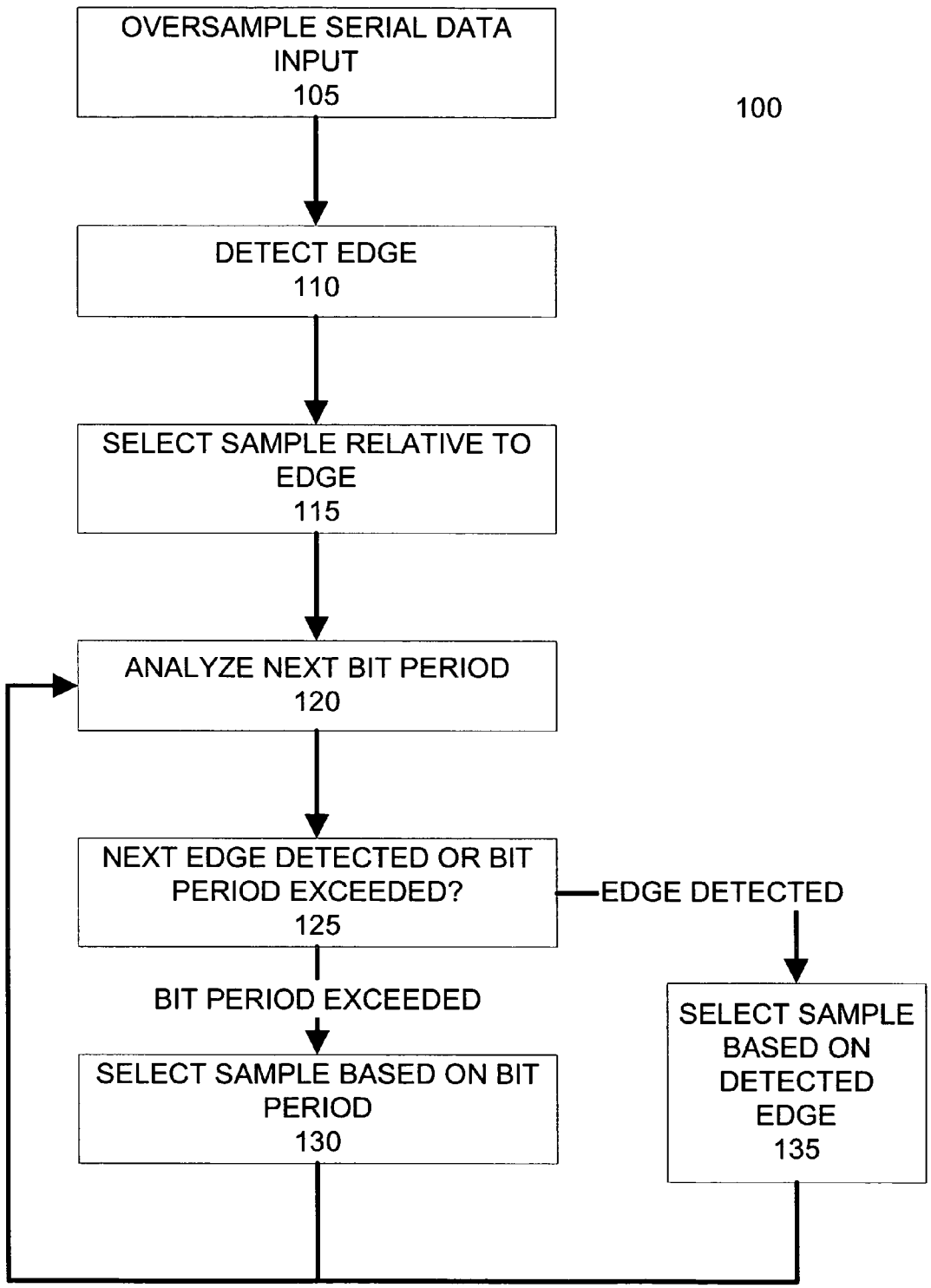
FIG. 1 is a flowchart illustrating a method according to an embodiment of the invention.

FIG. 1 is a flowchart illustrating a method 100 according to an embodiment of the invention. At step 105, the stream of serial data is oversampled by the receiving device so that, on average, several samples of serial data correspond to each bit of serial data. In one embodiment, step 105 uses three samples per bit, which provides high data rates and good jitter tolerance. In another embodiment, step 110 uses five samples per bit, which decreases the maximum bit rate but further improves jitter tolerance. As discussed in detail below, one implementation of step 105 samples the stream of serial data at multiple phases of the system clock, which allows the serial data rate to be greater than the clock rate of the receiving device.

Step 110 detects an edge in a set of sequential samples of the serial data stream. An edge is a transition between different values for adjacent samples. For example, a transition from a zero-valued sample to an adjacent one-valued sample is an edge. Similarly, a transition from a one-valued sample to an adjacent zero-valued sample is also an edge. In this embodiment, edges in a set of sequential samples signify a boundary between adjacent bits in the serial data stream. However, not all adjacent bits in the serial data stream are delineated by edges. When two adjacent bits have the same value, there will not be an edge between their corresponding samples.

After detecting an edge in step 110, step 115 determines the value of the bit ending with the located edge. In an embodiment, step 115 selects the next to last sample before the detected edge and sets the bit to this sample's value. In another embodiment, step 115 uses heuristics or other techniques to determine the value of the bit from its corresponding samples.

Following step 115, step 120 analyzes a portion of the set of sequential samples following, the detected edge that potentially corresponds to the next bit in the serial data stream. In an embodiment, this portion of the set of sequential samples is equal to the bit period. In the example of three sample per bit, the bit period is three samples. In this example, step 120 would analyze the three samples following the previously detected edge. Similarly, an example using five samples, on average, per bit would have a corresponding bit period of five samples. In this example, step 120 would analyze the five samples following the previously detected edge.

Step 125 evaluates the portion of the set of sequential samples analyzed in step 120. If another edge is detected within the portion analyzed by step 120, the method 100 proceeds to step 135. Otherwise, if step 125 determines that the portion of the set of samples evaluated in step 120 equals or exceeds the number of samples in the bit period, the method 100 proceeds to step 130.

Step 135 determines the value of the next bit in the serial data stream. Similar to step 115, an embodiment of step 135 selects the next to last sample before the newly detected edge and sets the bit to this sample's value. In another embodiment, step 135 uses heuristics or other techniques to determine the value of the bit from its corresponding samples.

Alternatively, if an edge is not detected by step 120, step 130 estimates the location of the next edge and determines the value of the next bit in the serial data stream based upon the estimated edge. In an embodiment, step 130 estimates the location of the next edge as one full bit period after the most recently detected edge. For example, if the bit period is three samples, then the estimated location of a new edge is three samples after the most recently detected edge. Similarly, for a bit period of five samples, the estimated location of a new edge is five samples after the most recently detected edge.

Once the location of the new edge is estimated by step 130, step 130 determines the value of the next bit in the serial data stream. In an embodiment, step 130 determined the value of the next bit in a manner similar to steps 115 and 135, for example by selecting the next to last sample before the newly estimated edge and setting the next bit in the serial data stream to this sample's value.

Following either step 130 or step 135, the method 100 returns to step 120 to analyze a subsequent portion of the set of samples of serial data. Steps 120 to 135 are repeated as long as there is additional serial data to be decoded. For subsequent iterations of steps 120 to 135, the edge detected in the previous iteration of step 120 or estimated in the previous iteration of step 130 is used as the most recently detected edge.

Figure 2:
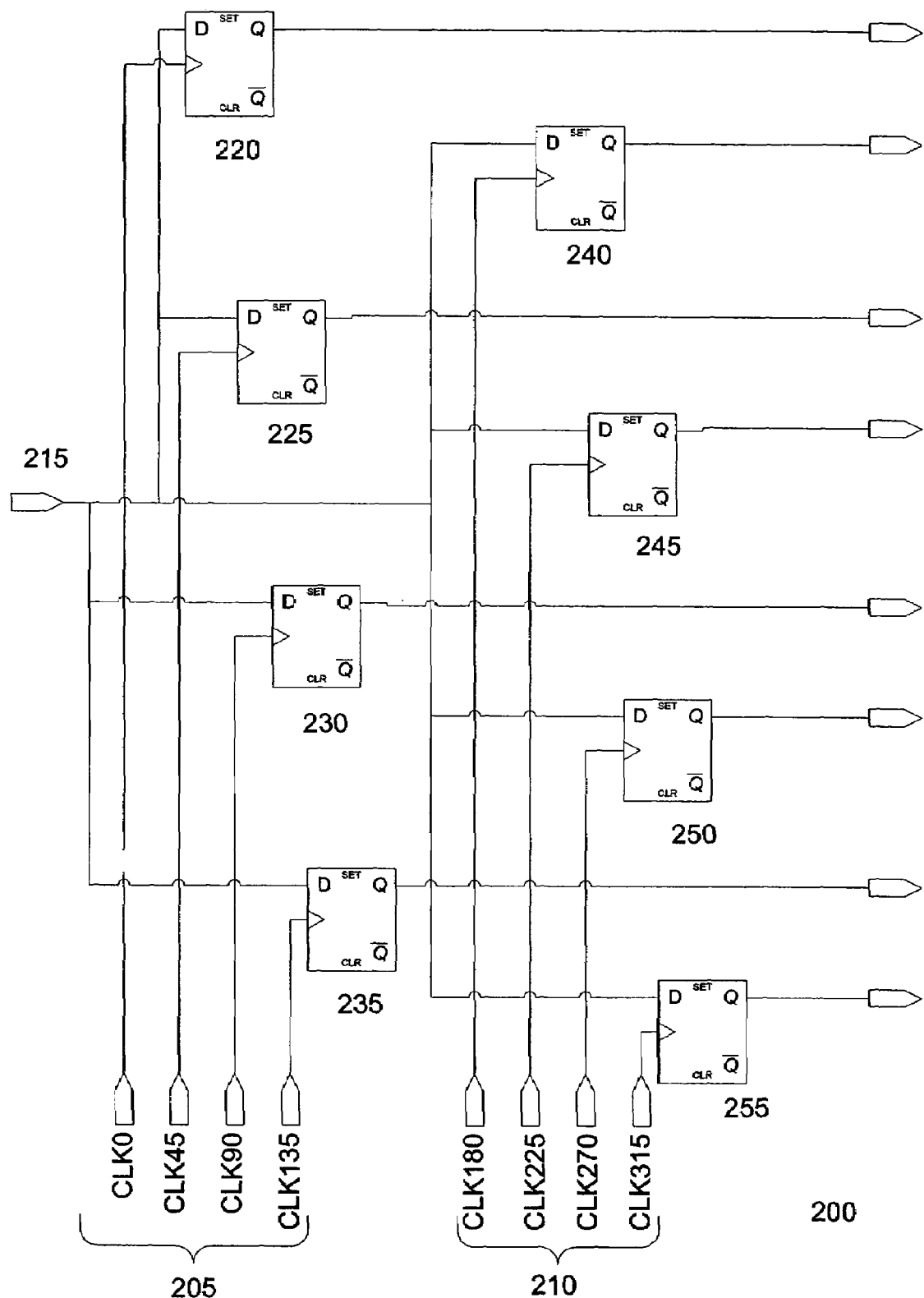
FIG. 2 illustrates a portion of a system according to an embodiment of the invention.

As discussed above, an embodiment of the invention samples the serial data at multiple phases of the system clock, which increases the maximum serial bit rate capable of being processed by the receiving device without increasing the clock frequency of the receiving device. FIG. 2 illustrates a portion of a system 200 according to an embodiment of the invention. In this embodiment, system 200 samples the serial data stream eight times per clock cycle. However, alternate embodiments of the invention can use greater or fewer samples per clock cycle to match the needs of different serial data communication specifications and applications.

In this embodiment, first 205 and second 210 sets of clock phases are used to initiate the sampling of the serial data stream in each phase of the clock cycle. The first set of clock phases 205 includes the unshifted or 0 degrees clock signal, and clock signals phase shifted by 45 degrees, 90 degrees, and 135 degrees. In an embodiment, these out of phase clock signals are generated from the unshifted clock signal using a phase locked loop. The first set of clock phases 205 are connected with flip-flops 220, 225, 230, and 235, respectively. Each flip-flop is connected with serial data input 215 and samples the serial data stream at the time specified by its respective clock phases. Thus, flip-flops 220, 225, 230, and 235 sample the serial data stream at clock phases 0, 45, 90, and 135 degrees, respectively.

Similarly, the second set of clock phases 210 are connected with flip-flops 240, 245, 250, and 255, respectively. The second set of clock phases 210 include clock signals phase shifted by 180, 215, 270, and 315 degrees. In an embodiment, the second set of clock phases 210 is generated by inverted each of the first set of clock phases 205. Each flip-flop is connected with serial data input 215 and samples the serial data stream at the time specified by its respective clock phases. Thus, flip-flops 240, 245, 250, and 255 sample the serial data stream at clock phases 180, 215, 270, and 315 degrees, respectively.

The outputs of flip-flops 220 to 255 comprise a set of eight samples of the serial data stream. In this embodiment, each clock cycle of the receiving device can capture a set of eight samples of the serial data stream, which can then be processed in accordance with method 100 discussed above to extract the serial data. Because of timing requirements, additional flip-flops or other buffers may be connected with the outputs of flip-flops 220 to 255 to resynchronize each set of eight samples with the unshifted clock signal. Depending upon the amount of oversampling, the set of eight samples can correspond to any number of bits of serial data. For example, with three samples per bit, each set of eight samples corresponds to 2.67 bits of serial data. Similarly, with five samples per bit, each set of eight samples corresponds to 1.6 bits of serial data.

A further embodiment of the invention extracts one or more bits of serial data from each set of samples in parallel, using the same concept of method 100. In this embodiment, each set of samples is analyzed to locate all of the edges in the set of samples and, if necessary, estimate the location of edges. The values of one or more bits of serial data are then determined from the location of all of the edges in the set of samples. The location of the most recent edge is then saved and used to process the next set of samples.

Figure 3A:
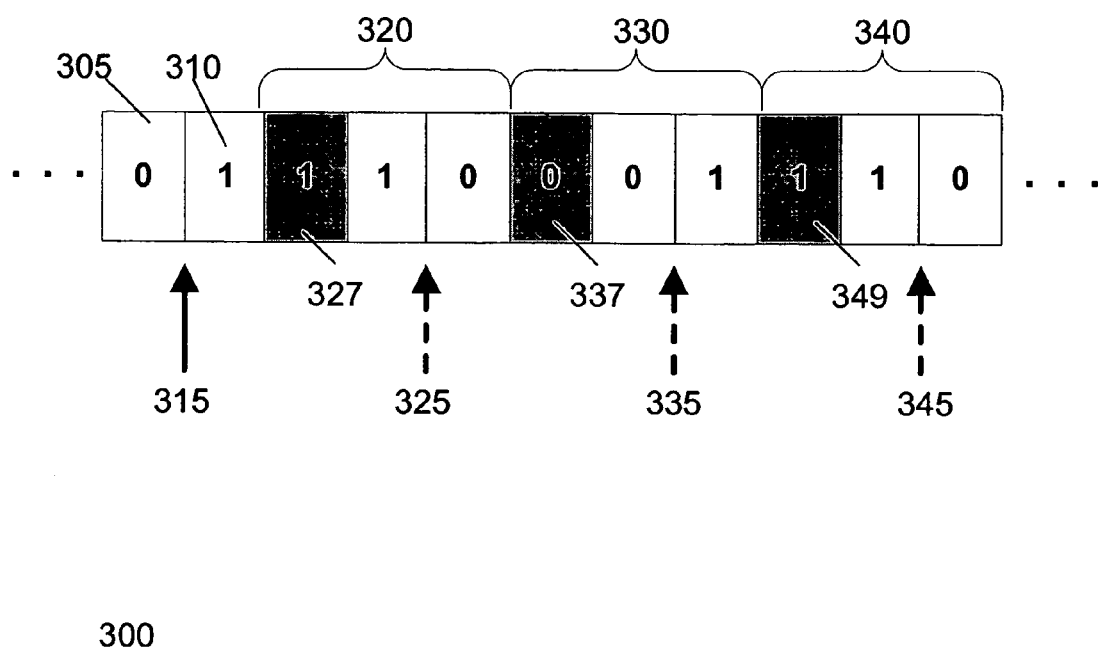
FIGS. 3A and 3B illustrate example applications of a method according to an embodiment of the invention.
Figure 3B:
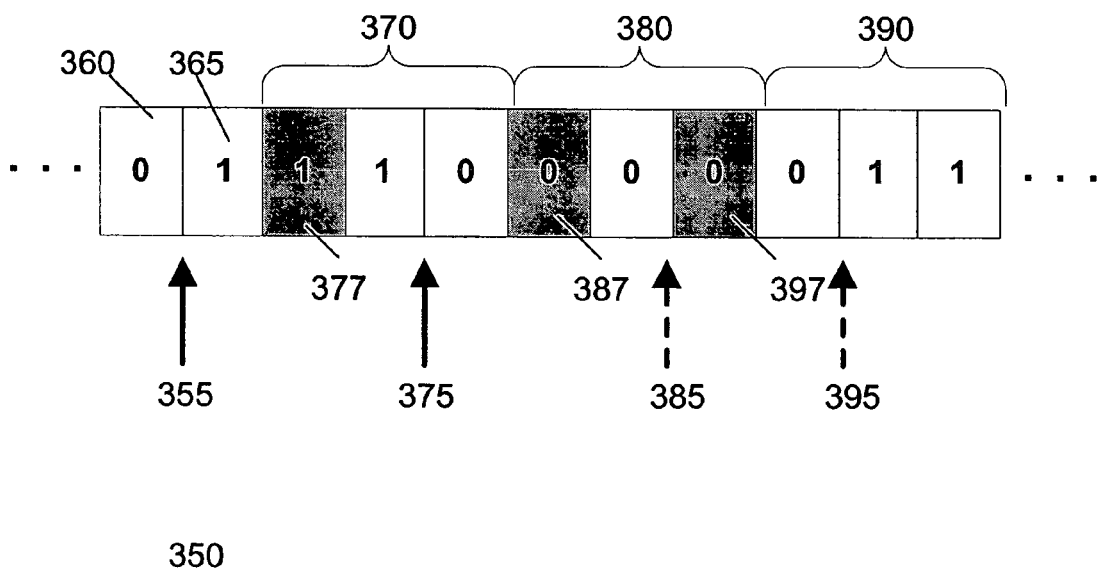

FIGS. 3A and 3B illustrate example applications of method 100 according to an embodiment of the invention. FIG. 3A illustrates a set of sample data 300 in which edges are detected in each bit period, such as in step 120 discussed above. In this example, an edge 315 is first detected between samples 305 and 310. Using this detected edge 315, step 120 would first analyze the bit period 320. Edge 325 is detected in bit period 320. Using this edge, sample 327 is selected as the value of the bit in step 135. For the next iteration of step 120, bit period 330 is analyzed and edge 335 is detected. From edge 335, sample 337 is selected as the value of the next bit in the serial data stream. For third iteration of step 120, bit period 340 is analyzed and edge 345 is detected. Using edge 345, sample 347 is selected as the value of a third bit in the serial data stream.

FIG. 3B illustrates a set of sample data 350 in which edges are estimated in each bit period, such as in step 135 discussed above. In this example, an edge 355 is first detected between samples 360 and 365. Following the detection of edge 355, bit period 370 is analyzed in step 120. Edge 375 is detected in bit period 370 and sample 377 is selected as the value of the next bit in the serial data stream. The next iteration of step 120 analyzes bit period 380. Because there is no edge in bit period 380, step 130 estimates the location of edge 385 from the location of edge 375 and selects sample 387 as the value of the next bit in the serial data stream. Using the location of edge 385, the next iteration of step 120 analyzes bit period 390 and detects edge 395. From edge 395, sample 397 is selected as the value of the next bit in the serial data stream.

The above described system and method can be implemented using a variety of different types of devices, including general digital logic devices, standard cell and structured ASICs, and programmable devices such as general gate arrays, programmable logic devices, and FPGAs.

Figure 4:
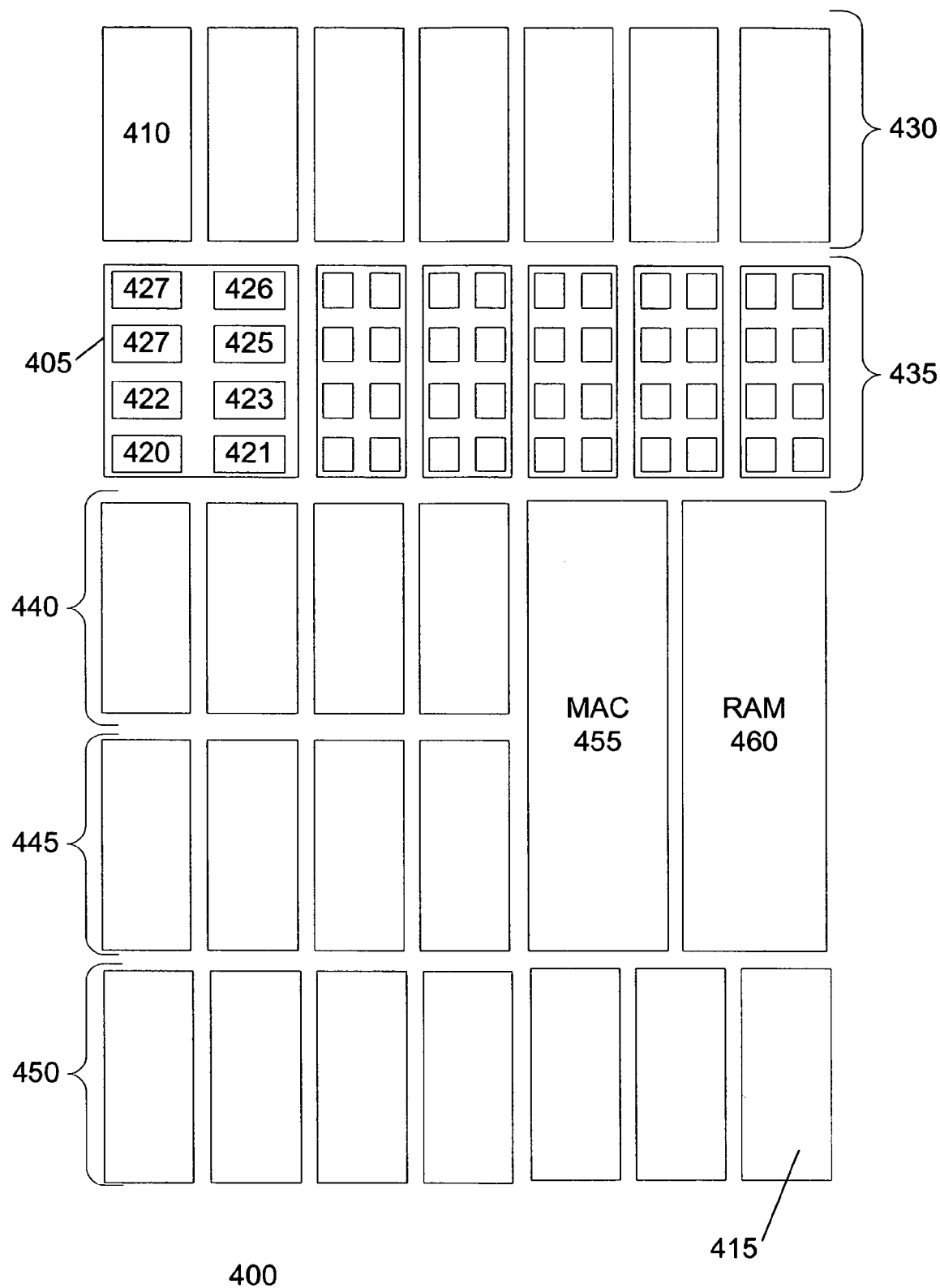
FIG. 4 illustrates an example programmable device suitable for implementing an embodiment of the invention.

FIG. 4 illustrates an example programmable 400 device suitable for implementing an embodiment of the invention. Programmable device 400 includes a number of logic array blocks (LABs), such as LABs 405, 410, 415. Each LAB includes a number of programmable logic cells using logic gates and/or look-up tables to perform a logic operation. LAB 405 illustrates in detail logic cells 420, 421, 422, 423, 424, 425, 426, and 427. Logic cells are omitted from other LABs in FIG. 4 for clarity. The LABs of device 400 are arranged into rows 430, 435, 440, 445, and 450. In an embodiment, the arrangement of logic cells within a LAB and of LABs within rows provides a hierarchical system of configurable connections, in which connections between logic cells within a LAB, between cells in different LABs in the same row, and between cell in LABs in different rows require progressively more resources and operate less efficiently.

In addition to logic cells arranged in LABs, programmable device 400 also include specialized functional blocks, such as multiply and accumulate block (MAC) 455 and random access memory block (RAM) 460. For clarity, the portion of the programmable device 400 shown in FIG. 4 only includes a small number of logic cells, LABs, and functional blocks. Typical programmable devices will include thousands or tens of thousands of these elements.

Further embodiments can be envisioned to one of ordinary skill in the art from the application and attached drawings. For example, although the invention has been discussed with reference to programmable devices such as field programmable gate arrays, it is equally applicable to applications used to design any type of digital device, such as standard cell ASICs, structured or mask-programmable ASICs, PLDs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of decoding data, comprising:
   receiving a stream of serial data;
   oversampling the stream of serial data to create a set of samples;
   analyzing the set of samples to detect an edge in the set of samples;
   determining a reference point in the set of samples in response to the detection of the edge in the set of samples;
   determining the reference point from the location of a previous reference point in response to the absence of the edge in the set of samples; and
   determining a first bit value from the location of the reference point.

2. The method of claim 1, further comprising:
   repeating the steps of analyzing, determining a reference point, and determining a first bit value for a subsequent bit value following the first bit value in the set of samples.

3. The method of claim 1, wherein determining the first bit value comprises:
   selecting a sample in the set of samples based on the location of the reference point; and
   setting the first bit value to the value of the selected sample.

4. The method of claim 3, wherein the selected sample is located at a predetermined position relative to the location of the reference point.

5. The method of claim 2, wherein determining the subsequent bit value from the location of the subsequent edge comprises:
   selecting a sample in the set of samples based on the location of a subsequent reference point; and
   setting the subsequent bit value to the value of the selected sample.

6. The method of claim 5, wherein the selected sample is located at a predetermined position relative to the location of the subsequent reference point.

7. The method of claim 1, wherein oversampling the stream of serial data to create a set of samples includes sampling the serial data stream at a sample rate optimized for a maximum bit rate.

8. The method of claim 7, wherein the sample rate is three times the bit rate of the stream of serial data.

9. The method of claim 1, wherein oversampling the stream of serial data to create a set of samples includes sampling the serial data stream at a sample rate optimized for a maximum jitter tolerance.

10. The method of claim 9, wherein the sample rate is five times the bit rate of the stream of serial data.

11. The method of claim 1, wherein oversampling the stream of serial data comprises:
    generating a set of phase-shifted clock signals; and
    sampling the stream of serial data using each of the set of phase-shifted clock signals.

12. A system for decoding data, the system comprising:
    a serial data input adapted to receive a stream of serial data;
    a set of phase-shifted clock signals derived from a system clock signal;
    a set of sample registers, each sample register connected with one of the set of phase-shifted clock signals and adapted to sample the stream of serial data in response to its connected phase-shifted clock signal, such that a set of samples are sampled for each period of the system clock signal; and
    a logic circuit adapted to decode a set of serial data bits from each set of samples;
    wherein the logic circuit is adapted to:
    analyze a first portion of the set of samples to detect an edge in the first portion of the set of samples;
    determine a bit value from the location of the edge in response to the detection of the edge in the first portion of the set of samples; and
    estimate the location of the edge and determine the bit value from the location of the estimated edge in response to the absence of the edge in the first portion of the set of samples.

13. The system of claim 12, wherein the logic circuit is further adapted to:
    analyze a second portion of the set of samples to detect an edge in the second portion of the set of samples;
    determine a subsequent bit value from the location of the edge in the second portion of the set of samples in response to the detection of the edge in the second portion of the set of samples; and estimate the location of the edge in the second portion of the set of samples and determine the subsequent bit value from the location of the estimated edge in response to the absence of the edge in the second portion of the set of samples.

14. The system of claim 12, wherein the logic circuit is adapted to determine the bit value from the location of the edge in response to the detection of the edge in the first portion of the set of samples by selecting a sample in the set of samples based on the location of the edge and setting the bit value to the value of the selected sample.

15. The system of claim 12, wherein the logic circuit is adapted to determine the bit value from the location of the estimated edge in response to the absence of the edge in the first portion of the set of samples by selecting a sample in the set of samples based on the location of the edge and setting the bit value to the value of the selected sample.

16. The system of claim 12, wherein the size of the first portion of the set of samples corresponds to the average number of samples per bit of the stream of serial data.

17. The system of claim 12, wherein the system is implemented using a programmable device.

18. The system of claim 17, wherein the programmable device is an FPGA.

19. A method of determining bit values in a serial data stream, comprising:
oversampling the serial data stream to create a set of samples;
finding a first sample edge;
setting a first bit value by reference to a sample that corresponds to the first sample edge;
repeating, for each additional desired bit value, the steps of:
searching for another sample edge; and
setting another bit value by reference to a sample that corresponds to the another sample edge if the another sample edge is found; or
estimating a location of the another sample edge by reference to the first sample edge and setting the another bit value by reference to a sample that corresponds to the estimated location if the another sample edge is not found.

20. A method of decoding data, comprising:
oversampling a serial data stream to create a set of samples;
searching for a sample edge; and
setting a data value by reference to a sample that corresponds to the sample edge if the sample edge is found; or
estimating a location of the sample edge by reference to a previously found sample edge and setting the data value by reference to a sample that corresponds to the estimated location if the sample edge is not found.

21. A method of receiving a plurality of data bits, the method comprising:
generating a first plurality of samples corresponding to a first bit period;
generating a second plurality of samples corresponding to a second bit period;
locating a first edge between two samples in the first bit period;
determining whether a second edge exists between two samples in the second bit period; and
if a second edge does exist between two samples in the second bit period, then determining a value of a first sample, the first sample between the first edge and the second edge, and assigning the value to a first received bit; else
if a second edge does not exist between two samples in the second bit period, then determining a first location in the second bit period, determining a value of a first sample, the first sample between the first edge and the first location, and assigning the value to a first received bit.

22. The method of claim 21 wherein determining the first location is done using the first edge.

23. The method of claim 21, wherein generating the first and second plurality of samples comprises:
generating a set of phase-shifted clock signals; and
sampling the plurality of data bits using each of the set of phase-shifted clock signals.

* * * * *